United States Patent [19]

Claussen et al.

[11] 4,421,861

[45] Dec. 20, 1983

[54] HIGH-STRENGTH AND TEMPERATURE-CHANGE RESISTANT CERAMIC FORMED BODY, ESPECIALLY OF MULLITE, ITS PRODUCTION AND USE

[75] Inventors: Nils Claussen, Leonberg; Günter Petzow, Leinfelden-Echterdingen, both of Fed. Rep. of Germany; Richard J. Brook, Leeds, England

[73] Assignee: Max-Planck-Gesellschaft zur Förderung der Wissenschaften e.v., Gottingen, Fed. Rep. of Germany

[21] Appl. No.: 150,850

[22] Filed: May 19, 1980

[30] Foreign Application Priority Data

May 22, 1979 [DE] Fed. Rep. of Germany ....... 2920795

[51] Int. Cl.$^3$ ...................... C04B 35/48; C04B 35/50
[52] U.S. Cl. .................................. 501/103; 501/104; 501/105; 501/152
[58] Field of Search ............... 501/103, 104, 105, 107, 501/152, 106

[56] References Cited

U.S. PATENT DOCUMENTS

| 2,842,447 | 7/1958 | Schlotzhauer et al. | 501/105 |
| 3,247,000 | 4/1966 | Taylor | 501/105 |
| 3,249,449 | 5/1966 | Kiehl et al. | 501/107 |
| 3,303,032 | 2/1967 | Holt et al. | 501/106 |
| 4,322,249 | 3/1982 | Claussen et al. | 501/105 |

Primary Examiner—James Poer
Attorney, Agent, or Firm—Felfe & Lynch

[57] ABSTRACT

A ceramic formed body having high temperature change resistance and strength and being composed of a ceramic matrix with dispersed particles of $ZrO_2$, $HfO_2$, or mixture thereof, is formed of a powdered ceramic material which is a precursor to the matrix material of the ceramic matrix, mixed with a compound which can form $ZrO_2$, $HfO_2$ or mixture thereof upon reaction with the ceramic material, and thereafter densely sintered below the reaction temperature. The sintered body is then heat treated above the reaction temperature to convert the precursor ceramic material into the matrix material and form the ceramic body with in situ formation of the dispersed particles.

15 Claims, 1 Drawing Figure

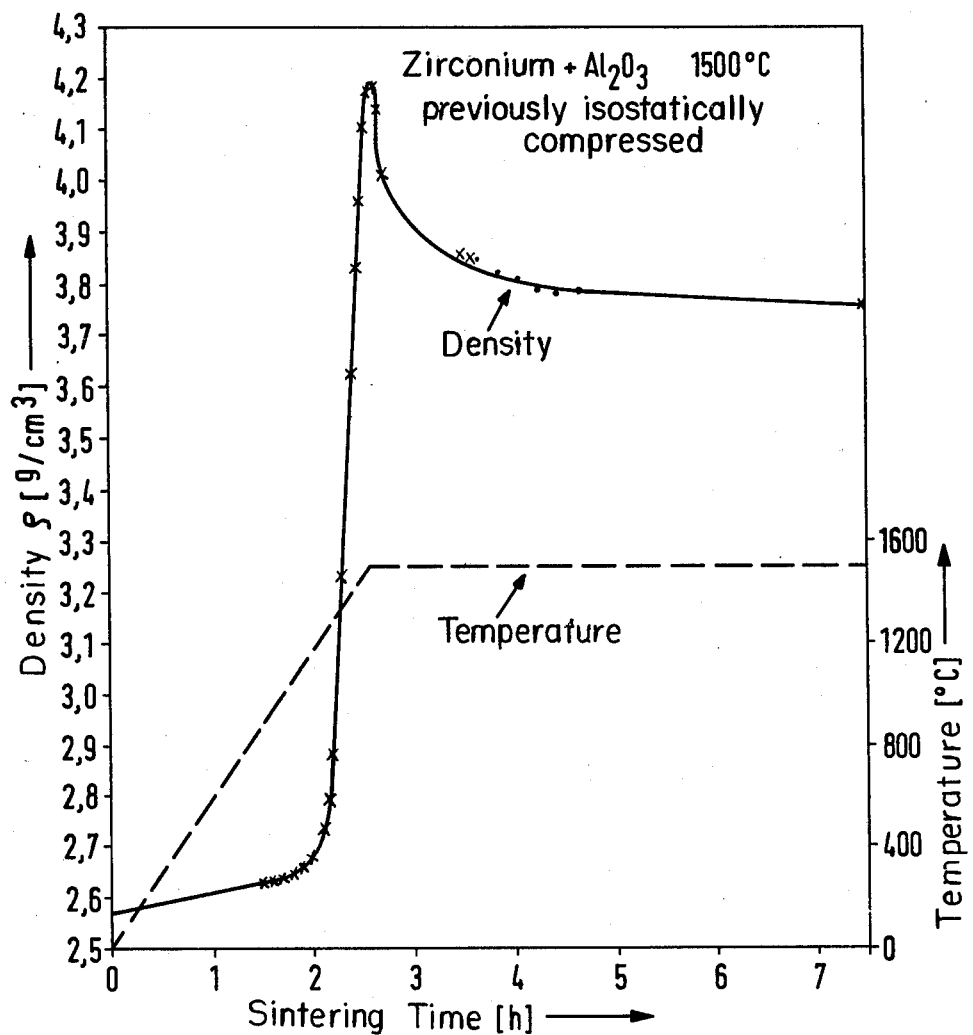

HIGH-STRENGTH AND TEMPERATURE-CHANGE RESISTANT CERAMIC FORMED BODY, ESPECIALLY OF MULLITE, ITS PRODUCTION AND USE

The invention concerns ceramic formed bodies with high fracture toughness and extraordinarily good temperature change resistance (TCR, thermal shock resistance), as well as a process for their production and their use.

From the literature (e.g. J. Am. Ceram. Soc. 59 (1976) 29, or published German Patent application No. 25 49 652), it is known that non-stabilised $ZrO_2$ incorporations (in tetragonal or monoclinic but not cubic lattice modification) considerably improve the fracture toughness of ceramics. Hitherto, this fact has been demonstrated, for example, with $Al_2O_3$, especially by mechanical mixing of the matrix powder with $ZrO_2$ powder, or by alloying of ZrO2 with stabilisers (e.g. MgO, CaO, $Y_2O_3$ etc.; in this regard, see "Partly stabilised $ZrO_2$" J. Am. Chem. Soc. 57(1974) 135).

However, these known processes are not suitable for use in the case of ceramics which, in pure form, normally cannot be densely sintered. In the case of such ceramics, the aimed for $ZrO_2$ dispersion for the improvement of the fracture toughness cannot be achieved in the previously known manner.

Therefore, the task forming the basis of the invention is to overcome these disadvantages and to provide ceramic formed bodies with high fracture toughness and especially good temperature change resistance which can consist of a material which normally cannot be densely sintered, such as mullite, forsterite and cordierite.

According to the invention, this task is solved by a ceramic formed body of high temperature change resistance and strength with dispensed $ZrO_2$ or $HfO_2$ particles, which is characterised in that it consists of a densely sintered ceramic matrix and is obtainable by sintering of a powdered mixture of the ceramic matrix material and of a $ZrO_2$- and/or $HfO_2$-containing compound and subsequent heat treating at a temperature lying above the sintering temperature.

In the case of the production of the ceramic formed body according to the invention, the $ZrO_2$ or $HfO_2$ particles form after the sintering of the mixture by an in situ chemical reaction.

According to the invention, the production of this formed body takes place in that a $ZrO_2$- or $HfO_2$-containing compound is so actively mixed with a ceramic additive and pressed into formed bodies that the components sinter densely at elevated temperatures before they can substantially react with one another and thereafter, in a further heat treatment, the reaction of the components takes place, with matrix formation, with in situ separating out of the $ZrO_2$ or $HfO_2$ particles.

According to the invention, the active mixing preferably takes place in an attrition mill or in a similar finely-grinding device. The pressing preferably takes place at pressures of 200 $MN/m^2$ to 500 $MN/m^2$. The sintering preferably takes place at temperatures between about 1300 and 1600, especially preferably 1400° to 1500° C. The temperature of the subsequent heat treatment preferably lies 50° to 150° C. higher than the sintering temperature.

The invention differs from the older Patent applications or publications on this subject by two principle differentiating characteristics:

1. It refers to ceramics which, in pure form, normally cannot be densely sintered (e.g. mullite) but, under the here-described conditions, can be completely consolidated with very little trouble (process for the production of dense and this very strong ceramic material—e.g. mullite, forsterite, etc.—by sintering or hot pressing).

2. The $ZrO_2$ or $HfO_2$ dispersion necessary for a further improvement of the fracture toughness is achieved by a chemical reaction and separating out in the ceramic matrix (process for the fine and uniform dispersion of $ZrO_2$ or $HfO_2$ particles in a ceramic matrix).

Both characteristics are coupled via the chemical reaction of zircon ($ZrSiO_4$ or other Zr-containing compounds) or hafnon with ceramics, such as $Al_2O_3$, MgO, etc. to mullite, forsterite, cordierite, etc, as matrix material, in that $ZrO_2$ particles separate out or are formed. The invention is suitable for the following reactions:

TABLE 1

Reactions in which $ZrO_2$ particles are formed or separate out (in situ) in a ceramic matrix

| No. | $ZrO_2$-containing compound | ceramic addition | $ZrO_2$ dispersion | matrix formed | melting point |
|---|---|---|---|---|---|
| 1 | $2ZrSiO_4$ | + $3Al_2O_3$ | → $2ZrO_2$ | + $3Al_2O_3.2SiO_2$ (mullite) | 1950 |
| 2 | $ZrSiO_4$ | + 2MgO | → $ZrO_2$ | + $2MgO.SiO_2$ (forsterite) | 1890 |
| 3 | $5ZrSiO_4$ | + 2MgO + $2Al_2O_3$ | → $5ZrO_2$ | + $2MgO.2Al_2O_3.5SiO_2$ (cordierite) | |
| 4 | $ZrSiO_4$ | + 2CaO | → $ZrO_2$ | + $2CaO.SiO_2$ | 2130 |
| 5 | $3ZrSiO_4$ | + $2BaZrO_3$ | → $3ZrO_2$ | + $2BaO.2ZrO_2.3SiO_2$ | 1380 |
| 6 | $ZrSiO_4$ | + 2FeO | → $ZrO_2$ | + $2FeO.SiO_2$ | 1180 |
| 7 | $6ZrSiO_4$ | + 7SrO | → $SrSiO_3 + 5ZrO_2$ | + $6SrO.5SiO_2.ZrO_2$ | 1550 |
| 8 | $ZrSiO_4$ | + $ThO_2$ | → $ZrO_2$ | + $ThSiO_4$ | 1975 |
| 9 | $ZrSiO_4$ | + 2ZnO | → $ZrO_2$ | + $SiO_2.2ZnO$ | |
| 10 | $CaZrO_3$ | + $2ZrTiO_4$ | → $2ZrO_2$ | + $CaO.ZrO_2.2TiO_2$ | |
| 11 | $ZrTiO_4$ | + 2MgO | → $ZrO_2$ | + $2MgO.TiO_2$ | 1740 |
| 12 | $ZrTiO_4$ | + $NbO_2$ | → $ZrO_2$ | + $NbO_2.TiO_2$ | |
| 13 | $ZrTiO_4$ | + $PbZrO_3$ | → $2ZrO_2$ | + $PbTiO_3$ | |
| 14 | $2ZrP_2O_3$ | + $3ThO_2$ | → $2ZrO_2$ | + $Th_3(PO_4)_4$ | 1400 |
| 15 | $ZrTiO_4$ | + $SrZrO_3$ | → $2ZrO_2$ | + $SrTiO_3$ | 2000 |

In the above reactions 1 to 15, the zirconium compound can be wholly or partly replaced by a corresponding hafnon compound.

With reservation, No. (1) represents the most important reaction which leads to the formation of dense mullite with finely divided (tetragonal and/or monoclinic) ZrO2 particles. Therefore, on the basis of the extraordinary technical importance of the so produced mullite, the invention is to be described in the following in more detail on the basis of this embodimental form.

The reaction itself is long since known and is described e.g. by E. Di Rupe et al., J. Mat. Sci. 14 (1979) 705. The decisive difference in comparison with the material discussed in this work, as well as the known fire-resistant ceramics based on $Al_2O_2$-$SiO_2$-$ZrO_2$ is that a dense body is first produced from $Al_2O_3$ and $ZrSiO_4$ (zircon) by sintering (possibly also hot pressing). In the case of the other reactions, this body is, in each case, formed from the components set out in column 1 and 2 of the Table, e.g. from MgO and zircon for the later reaction to forsterite with $ZrO_2$ particles, in that, by a subsequent heat treatment (e.g. at somewhat higher temperatures), the reaction to mullite with $ZrO_2$ particles is carried out; i.e. the essential characteristic forming the basis of the invention lies in the chronologically complete (or partial) separation of dense sintering and chemical reaction; only this makes possible the production of a dense, high-strength mullite. In order to achieve this separation, it is necessary that the powder mixture (thus, in the case of mullite formation, $Al_2O_3$ and $ZrSiO_4$) is very sinter-active. In the later given Examples, this is achieved by intensive grinding in an attritor provided with $Al_2O_3$ arms with the use of small (1 to 3 $\mu$m.) $Al_2O_3$ balls.

It is known that mullite, because of its low coefficient of thermal expansion (about $4.5 \times 10^{-6}$/K), possesses excellent thermoshock properties and that, insofar as it can be produced free of glass phases, it displays an outstanding high temperature creep strength which is substantially better than that of $Al_2O_3$ and can be regarded as being equivalent to that of $Si_3N_4$ and SiC (in this regard, see, inter alia, P. C. Dokko et al., J. Am. Ceram. Soc. 60 (1977) 150). In general, the chemical stability (e.g. oxidation stability) is even better than that of $Si_3N_4$ and SiC.

The poor sinter behaviour of pure mullite, as well as the good creep strength, can be explained by the complicated orthorhombic lattice of mullite which makes diffusion and creep processes difficult. By means of the compression before the mullite formation, this difficulty is, on the one hand, circumvented but, on the other hand the good creep strength after the mullite formation is fully utilised. The previous processes for the production of pure, synthetic mullite by (a) coprecipitation of $Al_2O_3$ and SiO gels (e.g. R. Roy, J. Am. Ceram. Soc., 39 (1956) 145), (b) vacuum decomposition of hydrolysed mixtures of Al and Si isopropoxides (e.g. K. S. Mazdiyasni et al., J. Am. Ceram. Soc., 55 (1972) 548) and (c) mixing of $\gamma$-$Al_2O_3$ with amorphous $SiO_2$(Ghate et al., Bull. Am. Ceram. Soc., 52 (1973) 670) are substantially more laborious in comparison with the process here employed. Furthermore, for a complete compression, the more expensive hot pressing must be employed, whereby, however, here, too, the glass phase cannot be completely avoided. The glass phase leads to a rapid drop of the strength with increasing temperature.

In the literature, the following optimum strengths and densities ($\rho$) of mullite have hitherto been reported. (1) a bending strength of 172 MN/m² for hot-pressed mullite with 95% of the theoretical density ($\rho_{th} = 3.16$ g/cm³); after fine grinding of the material, a sintering up to a density of 95% of theory is also possible, the strength thereby amounting to 117 MN/m² (R. A. Penty, Ph.D. Dissertation, Lehigh University, 1972). (2) by very long fine grinding, it was possible to sinter mullite at 1700° C. up to 98% of theory; the bending strength thereby achieved 152 MN/m² (B. C. Metcalfe et al., Trans. Brit. Ceram. Soc., 74 (1975) 193). (3) The hitherto highest bending strength was measured on hot pressed (1 h. at 1600° C.) samples with 269 MN/m² at almost 100% density (K. S. Mazdigasni and C. M. Brown, J. Am. Ceram. Soc., 55 (1972) 548). All here reported strengths concern pure, synthetic mullite which has been produced by means of the above-mentioned, laborious processes. In the case of pure mixtures of $SiO_2$ and $Al_2O_3$, there must be employed, e.g. sinter temperatures of >1800° C. and a period of 4 h. in order to obtain an 85% dense mullite body with a high glass phase proportion (P. Reynen et al., Ber. Dt. Keram. Ges., 55 (1978) 206).

The following advantages of the material according to the invention, here especially of the $ZrO_2$-containing mullite, and of the process, in comparison with the previous state of the art, can be set out:
(a) the carrying out of the process is very simple.
(b) the sinter temperatures are low (1400°–1600° C.)
(c) the sinter time is short.
(d) for a complete compression, the material does *not* have to be hot pressed.
(e) the strength, the fracture toughness and the TCR is more than 100% better than all previously produced (also hot-pressed) mullite ceramics.
(f) the higher temperature strength, as well as the creep behaviour, are, because of the absence of a glass phase (in the case of $Al_2O_3$-rich mixtures) considerably better.
(g) in the case of $ZrO_2$ separations present in tetragonal form, it is possible, by stress-induced change (e.g. grinding of the surface), to produce surface pressure stresses which further increase the strength (in this regard see: N. Claussen and J. Jahn, Ber. Dt. Keram. Ges., 55 (1978) 487).

BRIEF DESCRIPTION OF THE DRAWING

The drawing shows the effect on density of temperature and sintering time.

The following Examples explain the invention.

EXAMPLE 1

55 g. $ZrSiO_4$ powder ($\approx 10$ $\mu$m.) and 45 g. $Al_2O_3$ powder (about 0.7 $\mu$m.) were wet mixed for 4 h. in an attrition mill (Firm Netzsch) with 1–3 mm. sized attrition nballs of $Al_2O_3$ and subsequently spray dried. Thereafter, the powder mixture possessed a specific surface area of >10 m²/g. From the so resulting granulate, bodies were pressed with the dimensions of 50×12×15 mm. isostatically at a pressure of 300 MN/m² and sintered in the air for 1 h. at 1400° C. Thereafter, the body achieved complete denseness, without radiographically detectable reaction to mullite +$ZrO_2$. A further heat treatment at 1500° C. for 1 h. led to an almost 90% reaction to mullite (about 75%) with fine (<1 $\mu$m.) $ZrO_2$ separations (about 20%), 40% of which consisted of tetragonal and 60% of monoclinic $ZrO_2$ phase. On samples from these bodies, there was measured a 4-point bending strength (support distance: 28/9 mm.) of 420±20 MN/m² and a fracture toughness of $4.3\pm0.1$ MN/m$^{3/2}$. The samples had a density of 3.81 g./cm$^3$.

EXAMPLE 2

Isostatically pressed sample bodies (as described in Example 1 but ground for 6 h. instead of 4 h.) were subjected to the calcination treatment given in FIG. 1: slow, linear heating up at 1500° C. in 2.6 h. and subsequent maintenance at 1500° C. in the air. The curve shows that the compacting begins at 1200° C. and, in the case of reaching the maintenance temperature of 1500° C., is practically concluded without the reaction having commenced. The decrease of the density after achieving 1500° C. indicates the reaction to give mullite (theoretical density 3.16 g./cm$^3$) and ZrO$_2$ which, after the 4th calcination hour, is, to the greater part (95%) finished. After a calcination period of, in all, 7.5 h., no more unreacted Al$_2$O$_3$ can be detected radiographically. Thus this final sintered body possessed a density of 3.78 g./cm$^3$, a bending strength of $440\pm31$ MN/m$^2$ and a tensile strength of $4.4\pm0.1$ MN/m$^{3/2}$.

EXAMPLE 3

52 g. ZrSiO$_4$ and 48 g. Al$_2$O$_3$ were ground for 6 h. as in Example 2, isostatically pressed and sintered for 1 h. at 1600° C. in the air. Hereby there was also achieved a complete compacting, as well as a complete reaction to give mullite with finely divided residual Al$_2$O$_3$. After the sintering process, the spheriodally separated out ZrO$_2$ particles consisted of 55% tetragonal and 45% monoclinic ZrO$_2$. After the grinding of the surface, the monoclinic proportion in the surface region (depth about 30 $\mu$m.) increased to about 90%, which is to be attributed to a stress-induced conversion of the tetragonal ZrO$_2$ particles. The 4-point bending strength in the ground surface state amounted, as a result of the induced compression stress, to $580+35$ MN/m$^2$. The strength in the sintered state reaches $450+28$ MN/m$^2$ at room temperature as well as at 1250° C. This fact indicated the glass-free state of the material.

We claim:

1. A ceramic formed body having high temperature change resistance and strength and being composed of a ceramic matrix with dispersed particles of ZrO$_2$, HfO$_2$ or a mixture thereof, said ceramic formed body being produced by the process of:

forming a mixture of a powdered ceramic material which is a precursor to the matrix material of the ceramic matrix; with a compound which can form ZrO$_2$, HfO$_2$ or a mixture thereof upon reaction with the ceramic material above a reaction temperature, the reaction temperature being that temperature at which the ceramic material is converted into the matrix material; thereafter densely sintering said mixture below said reaction temperature; and thereafter heat treating said densely sintered mixture by raising its temperature above said reaction temperature, to convert the precursor ceramic material into the matrix material and form the ceramic body with in situ formation of the dispersed particles.

2. The ceramic formed body of claim 1 wherein the ceramic material is Al$_2$O$_3$, MgO, CaO, BaZrO$_3$, FeO, SrO, ThO$_2$, ZnO, ZrTiO$_4$, NbO$_2$, PbZrO$_3$ and SrZrO$_3$.

3. The ceramic formed body of claim 1 wherein the compound which can form ZrO$_2$ is ZrSiO$_4$, ZrTiO$_4$ or ZrP$_2$O$_3$.

4. The ceramic formed body of claim 1 wherein the compound which can form ZrO$_2$ is ZrSiO$_4$, ZrTiO$_4$ or ZrP$_2$O$_3$.

5. The ceramic formed body of claim 1, characterized in that it is free of a glass phase.

6. The ceramic formed body of claim 1 or 5, wherein the matrix consists of mullite, and zircon is added as the ZrO$_2$-containing compound.

7. The ceramic formed body of claim 1 or 5, wherein the matrix consists of forsterite, the ceramic material is MgO and the ZrO$_2$-containing compound is zircon.

8. The ceramic formed body of claim 1 or 5, wherein the matrix is cordierite and the ceramic material is a mixture of MgO and Al$_2$O$_3$ and the ZrO$_2$-containing compound is zircon.

9. The ceramic formed body of claim 6 having a weight ratio of zircon to Al$_2$O$_3$ of 45 to 60% zircon to 40 to 55% Al$_2$O$_3$.

10. A process for the production of the ceramic formed body of claim 1 comprising the steps of forming a mixture of a powdered ceramic material which is a precursor to the matrix material which forms the ceramic matrix, with a compound which can form ZrO$_2$, HfO$_2$ or a mixture thereof upon reaction with the ceramic material above a reaction temperature, the reaction temperature being that temperature at which the ceramic material is converted into the matrix material; thereafter densely sintering said mixture below said reaction temperature; and thereafter heating treating said densely sintered mixture by raising its temperature above said reaction temperature, to convert the precursor ceramic material into the matrix material and form the ceramic body with in situ formation of the dispersed particles.

11. The process of claim 9 wherein zircon and Al$_2$O$_3$ form the mixture to be densely sintered; the dense sintering is accomplished at a temperature between 1300° and 1450° C; and the heat treatment is carried out at 1450° to 1750° C.

12. The process of claim 10 wherein the formation of the mixture is carried out in an attritor with the use of Al$_2$O$_3$ attritor balls.

13. The process of claim 10 wherein the mixture is isostatically pressed to give the formed body.

14. The process of claim 10 wherein finely mixed powdered starting materials are formed into bodies by injection moulding.

15. The process of claim 10 further comprising grinding the heat treated ceramic body to convert the ZrO$_2$ particles present in the tetragonal modification into the monoclinic form.

* * * * *

UNITED STATES PATENT AND TRADEMARK OFFICE
CERTIFICATE OF CORRECTION

PATENT NO. : 4,421,861
DATED : December 20, 1983
INVENTOR(S) : Claussen et al.

It is certified that error appears in the above-identified patent and that said Letters Patent is hereby corrected as shown below:

Claim 10, line 13    "heating" should be -- heat --.

Claim 11, line 1     "9" should be -- 10 --.

Signed and Sealed this

Seventh Day of August 1984

[SEAL]

Attest:

GERALD J. MOSSINGHOFF

Attesting Officer    Commissioner of Patents and Trademarks